S. D. COLVIN.
ELECTRICAL SUPERHEATER.
APPLICATION FILED JULY 19, 1919.
1,346,741.
Patented July 13, 1920.
2 SHEETS—SHEET 1.
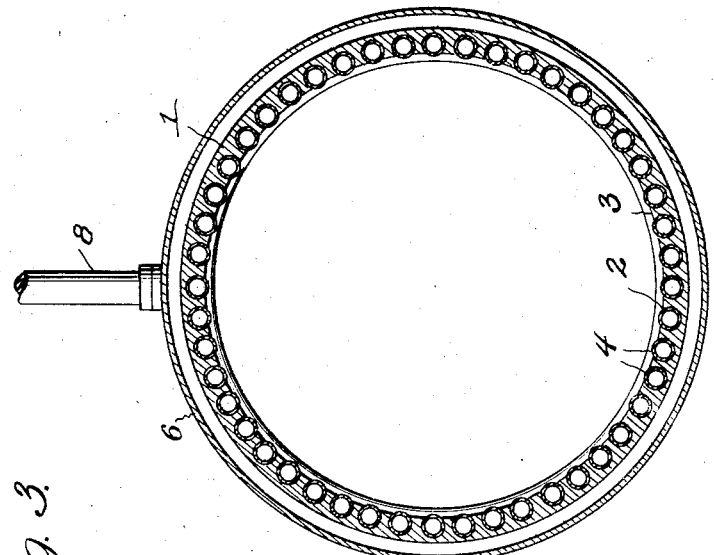
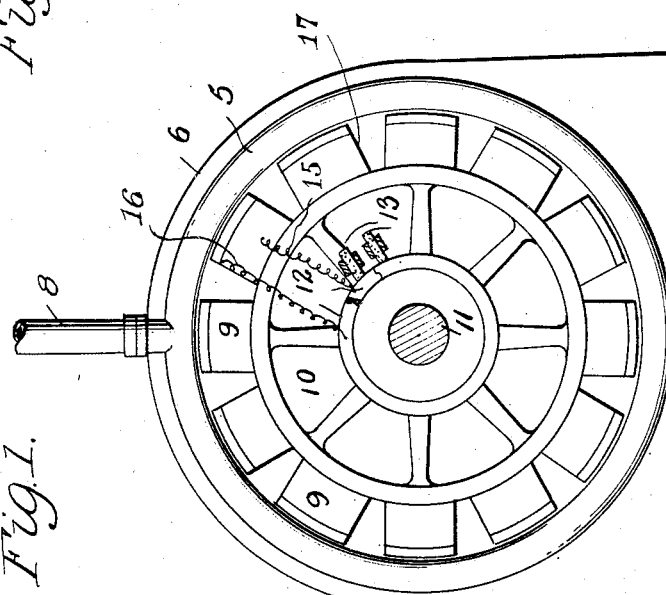
INVENTOR.
BY S. D. Colvin
Victor J. Evans
ATTORNEY.

S. D. COLVIN.
ELECTRICAL SUPERHEATER.
APPLICATION FILED JULY 19, 1919.
1,346,741.
Patented July 13, 1920.
2 SHEETS—SHEET 2.
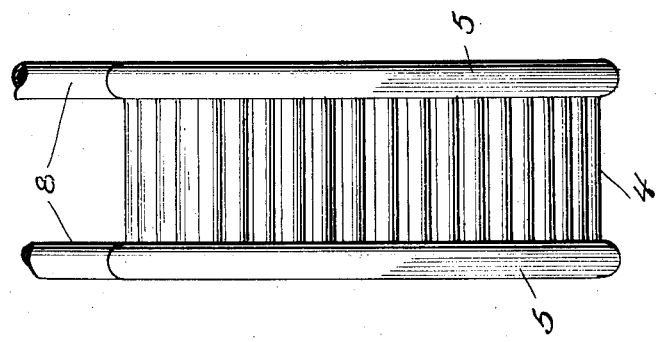
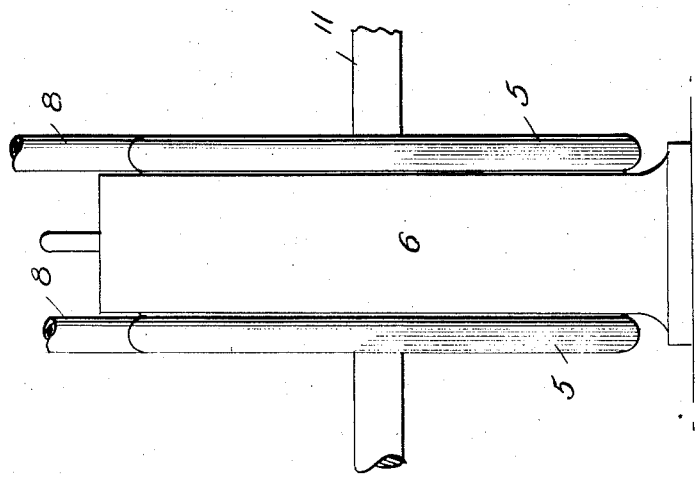
INVENTOR.
BY S. D. Colvin
Victor J. Evans
ATTORNEY.

UNITED STATES PATENT OFFICE.

SHADY DALE COLVIN, OF MYRTIS, LOUISIANA, ASSIGNOR OF ONE-HALF TO WILLIAM H. WELCH, OF MYRTIS, LOUISIANA.

ELECTRICAL SUPERHEATER.

1,346,741.   Specification of Letters Patent.   Patented July 13, 1920.

Application filed July 19, 1919. Serial No. 311,910.

*To all whom it may concern:*

Be it known that I, SHADY DALE COLVIN, a citizen of the United States, residing at Myrtis, in the county of Caddo and State of Louisiana, have invented new and useful Improvements in Electrical Superheaters, of which the following is a specification.

The object of my present invention is the provision of a simple, inexpensive and highly efficient apparatus for electrically super-heating steam or water.

To the attainment of the foregoing, the invention consists in the peculiar and advantageous super-heater hereinafter described and definitely claimed.

In the accompanying drawings:

Figure 1 is a side elevation of the superheater constituting the best practical embodiment of my invention that I have as yet devised.

Fig. 2 is an end elevation of the superheater.

Fig. 3 is a diametrical section illustrative of the super-heater.

Fig. 4 is a detail view showing the arrangement of the transverse tubes relatively to the stator of the super-heater.

Similar numerals of reference designate corresponding parts in all of the views of the drawings.

Among other elements my novel superheater comprises a stator 1. The said stator is of annular form, and is preferably made up of soft iron stampings. It is characterized by slots 2, formed in its inner face 3 and extending between its sides. The said slots are arranged close together, as shown, in order to contribute to the capacity of the super-heater. In the slots 2 are arranged tube sections 4, of high resistance quality. At opposite sides of the stator and connected with the opposite ends of the tube sections 4 are annular headers 5, carried by a frame 6 to which they are appropriately connected, and having connections 8 for the introduction and discharge of steam or water or other fluid that is to be superheated. My invention contemplates the heating of the tube sections 4 by electricity supplied to them by induction from field coils 9, carried by a rotor 10 that is fixed on a shaft 11; it being noticed in this connection that the arrangement of the tube sections 4 between the headers 5 and in the slots 2 is adapted to form a short circuit. The field coils 9 are charged by an exciter or any source of direct current, and the temperature of the tube sections 4 is regulated by the speed of the rotary portion of the super-heater, or, when desired, by the exciting current. In addition to the rotor 10, the shaft 11 is equipped with distributing rings 12, and the brushes 13 complementary to said distributing rings are electrically connected, as indicated by 14; the distributing rings being electrically connected at 15 and 16 with the field coils, which are connected in series, as illustrated.

In the preferred embodiment of the invention, the field coils 9 are disposed as shown in Fig. 1 in notches 17 formed in the perimeter of the rotor 10.

In the practical operation of my novel super-heater, it will be manifest that the tube sections 4 will be heated through the medium of electricity supplied by induction from the field coils 9 as said coils are moved within the stator 1 and within the circular series of transverse tube sections 4; also, that because of the temperature of the said tube sections 4 being higher than that of the steam or water, the steam or water will be super-heated *en route* through the super-heater—*i. e.*, incidental to the passage of the steam or water from one annular header 5 to the other.

Having described my invention, what I claim and desire to secure by Letters-Patent, is:

1. In an electrical fluid super-heater, the combination of annular headers spaced apart, a frame between the planes of the headers and to which they are connected, an annular stator housed in the frame and interposed between the headers, tubing of high resistance carried in the stator, and interposed and effecting communication between the headers, a rotor, field coils carried by the rotor and movable within the stator and said tubing, and means for supplying said coils with current.

2. In an electrical fluid super-heater, the combination of annular headers spaced apart, a frame between the planes of the headers and to which they are connected, an annular stator housed in the frame and interposed between the headers and made up of soft iron stamping and having slots formed in the inner face and extending from side to side thereof, tube sections arranged in said slots and interposed and effecting communication between the headers, a rotor disposed within the stator and the circular series of tube sections, field coils carried by the rotor and movable within the stator and the circular series of tube sections, and means for supplying said coils with current.

3. In an electrical fluid super-heater, the combination of annular headers spaced apart, a frame between the planes of the headers and to which they are connected, an annular stator housed in the frame and interposed between the headers, and made up of soft iron stampings and having slots formed in the inner face and extending from side to side thereof, tube sections arranged in said slots and interposed and effecting communication between the headers, a rotor disposed within the stator and the circular series of tube sections, field coils carried by the rotor and movable within the stator and the circular series of tube sections, and means for supplying said coils with current; the rotor being provided with notches in its perimeter, and the field coils being disposed in said notches.

In testimony whereof I affix my signature.

SHADY DALE COLVIN.